United States Patent [19]

Braun

[11] 4,024,810

[45] May 24, 1977

[54] LIQUID SETTLING AND PRESS CONTAINER

[76] Inventor: Oskar Braun, Wilhelmstrasse 41, 614 Bensheim, Bergstrasse, Germany

[22] Filed: Oct. 6, 1975

[21] Appl. No.: 619,661

[30] Foreign Application Priority Data

Oct. 31, 1974 Germany .......................... 2451756
Nov. 28, 1974 Germany .......................... 2456247

[52] U.S. Cl. .............................. 100/116; 100/107; 100/211; 210/350
[51] Int. Cl.² ....................... B30B 5/02; B30B 9/22
[58] Field of Search .......... 100/211, 107, 108, 110, 100/112, 116, 121, 126, 37; 210/350

[56] References Cited

UNITED STATES PATENTS

| 2,538,403 | 1/1951 | Watson ............................... 100/211 |
| 2,882,815 | 4/1959 | Bernier ........................... 100/211 X |

FOREIGN PATENTS OR APPLICATIONS

| 711,694 | 5/1931 | France ............................... 100/211 |
| 1,049,205 | 8/1953 | France ............................... 100/211 |

Primary Examiner—Peter Feldman
Attorney, Agent, or Firm—Kinzer, Plyer, Dorn & McEachran

[57] ABSTRACT

The invention relates to a fluid or liquid settling and pressing tank for materials containing liquid, like grape, fruit mash or the like, in the most diverse forms, for example as cylinders, polygons, spheres of the like, with pressing systems arranged in the interior in the form of an elastic membrane which can be pressed by means of compressed air or hydraulic pressure into the interior of the container, also comprising loading and discharge apertures, whereby the container is rotated about its axis and designed as a closed container having immediately ahead of the one frontal wall and/or at a distance from the container jacket, a screen bottom.

3 Claims, 4 Drawing Figures

LIQUID SETTLING AND PRESS CONTAINER

SUMMARY OF THE INVENTION

This is concerned with a container which may be used at the same time as a mash tank, as a rotary juice squeezing tank, as a press, as a storage tank and as a shipping container. The result is a high squeezing effect at low mechanical expenditure, and in particular, a large unit can be produced very economically. However, it has been discovered that such a container, particularly when it is of oblong shape, that is when the length equals a multiple of the diameter, is disadvantageous, because when squeezing material to be pressed, where residues with a high weight are produced, the membrane can be returned only with very great difficulty and moreover these residues and the rotation of the container may lead to damage to the membrane.

The present invention is based on the problem of obviating these disadvantages. This is accomplished in that the membrane is fastened at the container in unloaded condition as a surface formation parallel with a plane placed through the axis of rotation and dividing the container into two areas.

This, moreover, offers the advantage that any kind of pressable materials can be processed, without damages occurring at the membrane. The cut and/or shaping of the membrane is extremely simple so that such membrane in comparison with the earlier used hoselike membranes is considerably simplified in their production and cost-saving. Moreover, the possibility exists to produce that part of the container which does not come in contact with the material to be squeezed out, from simple material, so that thereby the manufacturing costs of such a container can be reduced considerably, if necessary.

The embodiment according to prior art in addition has the disadvantage that as a result of the drainage system contemplated for the squeezed out juice, the latter is exposed to an increased oxidation, so that correspondingly more substances must be added to the juice for its preservation. Another disadvantage resides in the fact that by arranging the tub or groove and an additional pump, the corresponding construction costs will rise accordingly.

In addition, the invention is based on the problem of reducing the construction costs for such containers and to eliminate as far as possible the danger of oxidation of the squeezed out juice.

This is accomplished in that the screen side shaft stub is extended as far as the screen bottom and the shaft stub is designed as a hollow shaft, that reinforcement ribs are arranged between the screen bottom and the second container bottom radially extending in relation to the axis of rotation, of which at least one rib completely partitions the area between screen, bottom and shaft stub and that perforations are provided in the hollow shaft in the direction of rotation immediately ahead of this rib.

Thereby the advantage is accomplished that the squeezed out juice can drain in a closed system directly by the squeeze pressure raised for squeezing the mash by way of the membrane and is conveyed to the desired location, namely a storage or fermentation tank mostly closed. Moreover, the oxidation of the squeezed juice is thereby reduced to a minimum. As a result of the considerably reduced construction costs the production costs of such a press can likewise be reduced substantially.

The invention is explained more in detail by means of the following specification on the basis of an embodiment exemplified in the drawings.

DESCRIPTION OF THE PREFERRED EMBODIMENTS

Figure 1:
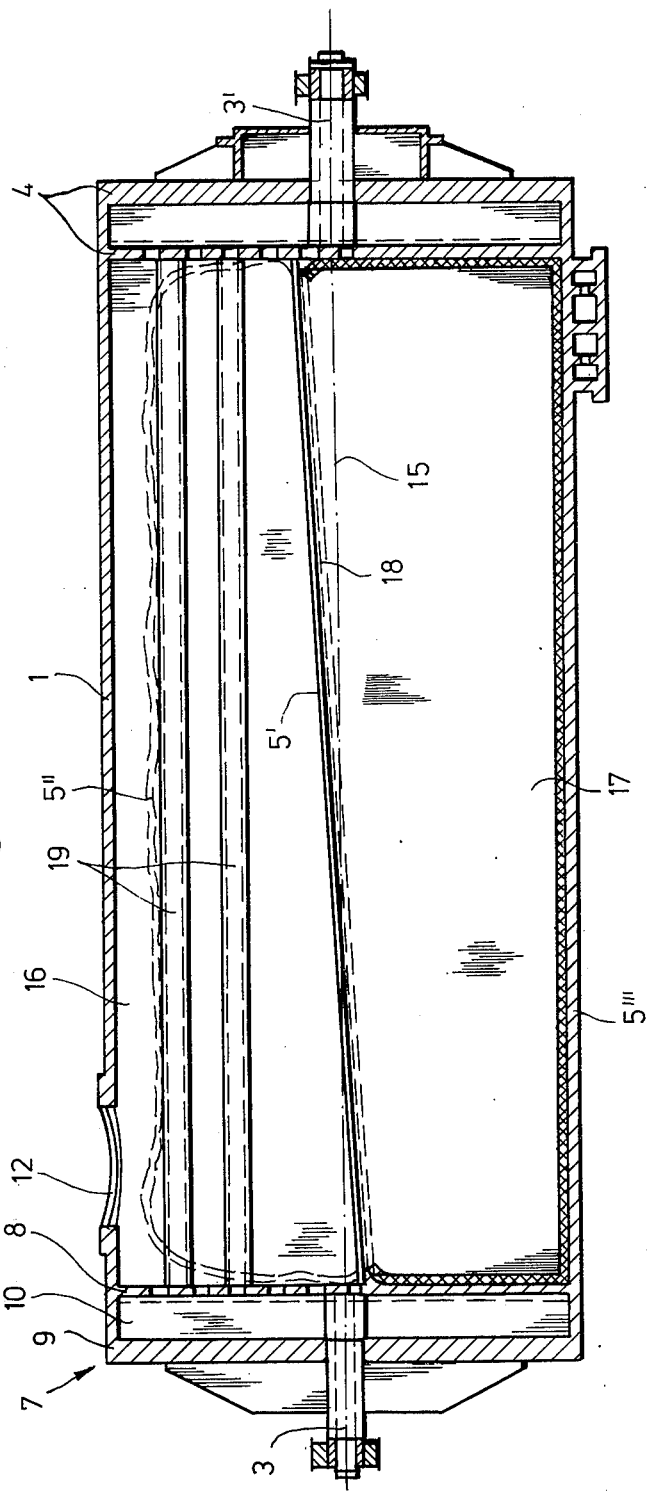
FIG. 1 shows a longitudinal section through a container according to the invention.
Figure 2:
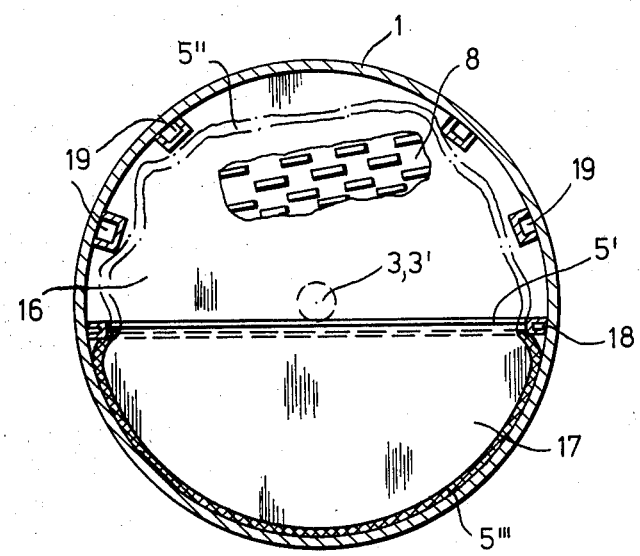
FIG. 2 represents a cross section through the container shown in FIG. 1.

In the embodiment exemplified in the drawings, a container 1 of oblong shape is placed on a machine frame rotatable about its horizontal longitudinal axis 15. This outwardly sealed container may have a circular, oval or polygonal cross section. Lateral shaft stubs 3,3' are used for positioning which may be used, if applicable, on the one hand as an inlet for the pressure medium, and on the other hand as a fluid drain. In the embodiment shown, this container 1 is sealed at the right side by the front wall 4, where the connection for the pressure medium is placed at the shaft stub 3'.

The diaphragm 5' represents in unloaded condition a surface formation which partitions the container 1 in a plane extending approximately parallel with the axis of rotation 15, into the two areas 16 and 17, respectively. A flange 18 applied in the interior of the container 1 or clamping bodies mounted at intervals at the container jacket are used for fastening. The slight sloping of the membrane 5' is due to the fact that the two shaft stubs, 3,3' are in contact with the prevailiing area 16 and/or 17.

A screen bottom 8 is placed at the frontal wall 7 of the container located opposite the front wall 1, and a sealing cover 9 is provided at a distance thereto toward the outside. A juice collecting area 10 is formed between this screen bottom 8 and the cover 9. U-shaped liquid drainage channels 19, for example of perforate screen sheet metal, are applied from frontal wall 8 to frontal wall 4 at the inner container wall coming in contact with the material being squeezed. This provides an improved drain of liquid into the juice collection area 10. By using at the front wall 4 an additional screen bottom with juice collection area, both areas can be connected by the channels 19.

The mash to be squeezed is loaded into the area 16, with the loading possible via the cover 12, and thereby the membrane is pressed through downward, so that it will assume the position according to 5'''. By mustering the pressure medium, the membrane is gradually urged upward and will eventually occupy the position according to 5''.

The membrane 5' also may be so designed that in unloaded condition it adheres to the inner wall of the container, approximately sagging downward, thereby assuming the shape and form identified by the reference symbol 5'''.

Figure 3:
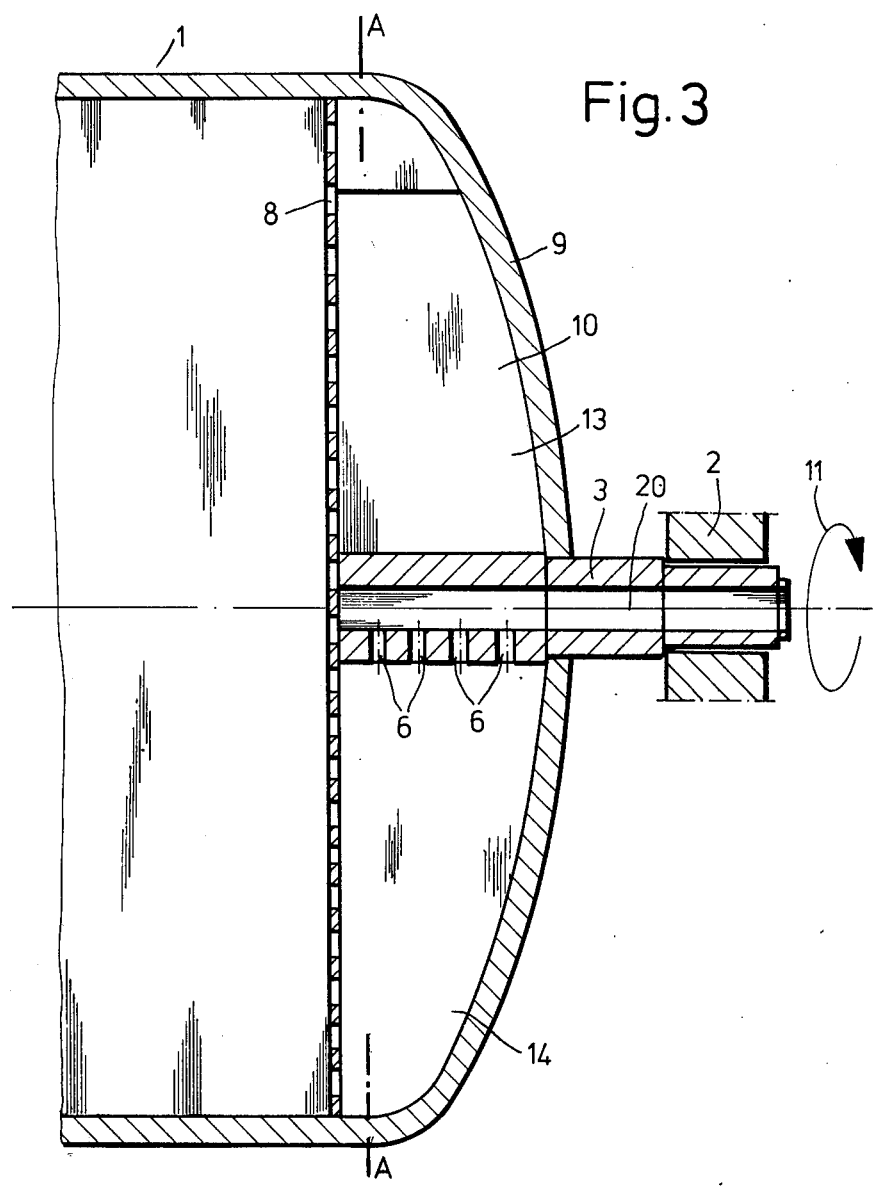
FIG. 3 shows a partial longitudinal section through such a container.
Figure 4:
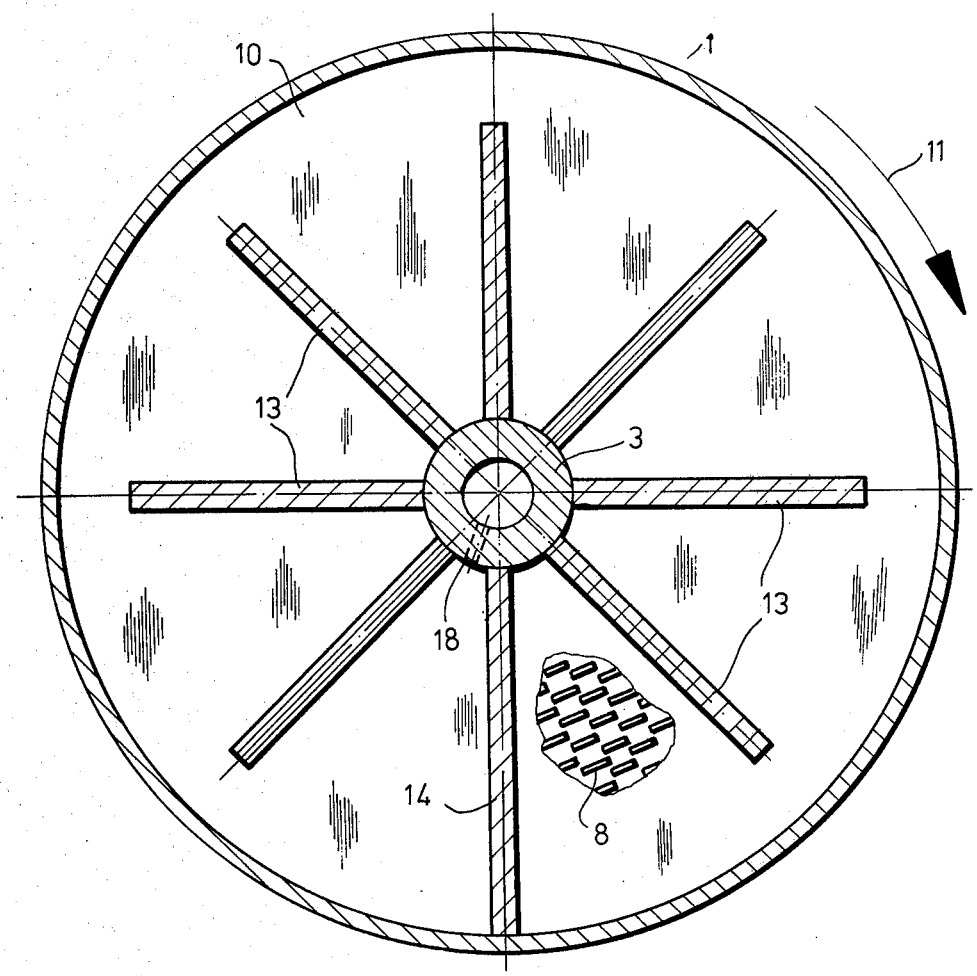
FIG. 4 shows a cross section along line A—A in FIG. 3.

In the embodiment shown in FIGS. 3 and 4, a container 1 is shown with an outwardly curved container bottom 9, the screen bottom 8 preceding said container bottom 9. Along the axis of the container 1 this screen bottom 8 is supported at a shaft stub 3 designed as a hollow shaft which is positioned at a frame 2.

Reinforcement ribs 13 and/or 14 are arranged in the juice collection area 10 radial to the axis of rotation, at the shaft stubs 3, in this embodiment whereby the reinforcement rib 14 adheres with its edges completely at the container bottom 9, the screen bottom 8 and the shaft stubs 3, thus completely partitioning the juice collection area at this point. The other reinforcement ribs 13 are of shorter design and permit a passage of the juice into the individual areas. Perforations 6 are applied immediately ahead of the reinforcement rib 14 viewed in the direction of rotation, in the shaft stub 3, through which the squeezed out juice can flow off via the hollow shaft.

The container 1 slowly propelled in the direction of rotation 11 can drain completely via these perforations 6 and the drain 20, whereby this draining is made possible by the reinforcement rib 14 which conveys the juice upward within the collection area 10, so that a complete draining is possible. A hose can be connected immediately at the drain 20 and be connected to a storage and/or fermentation tank.

The embodiments of the invention in which an exclusive property or privilege is claimed are defined as follows:

1. A liquid settling and pressing tank for materials containing liquids, such as grapes, fruit mash and similar materials, said tank having elongated shape with its maximum longitudinal dimension being at least several times its maximum lateral dimension with said tank mounted horizontally for rotation about its longitudinal dimension, a liquid collecting section located at one end of said tank and separated from the remainder of said tank by a laterally extending wall with said wall having a perforate portion and an imperforate portion, an elastic membrane located in said tank and extending generally along the length of said tank from said laterally extending wall and separating the tank into a material section and a pressurized fluid section, said material section communicating with said liquid collecting section through said perforated portion of said laterally extending wall, said pressurized fluid section being separated from said liquid collecting section by said imperforate portion of said laterally extending wall, an opening in said tank for introducing and removing said material from said material section, an opening in said tank for introducing and removing said pressurized fluid, and an opening in said tank into said liquid collecting section for removal of said collected liquid.

2. The liquid settling and pressing tank of claim 1 including liquid drainage channels leading from the material section of said tank to said liquid collecting section.

3. The liquid settling and pressing tank of claim 2 in which said liquid drainage channels are mounted on the interior surface of the side wall of said tank and extend generally the length of the tank.

* * * * *